May 24, 1955 R. E. RISLEY 2,708,951
REPAIR SLEEVE
Filed Aug. 8, 1950 4 Sheets-Sheet 1

INVENTOR.
ROGER E. RISLEY
BY
*Robert E. Burns*
ATTORNEY.

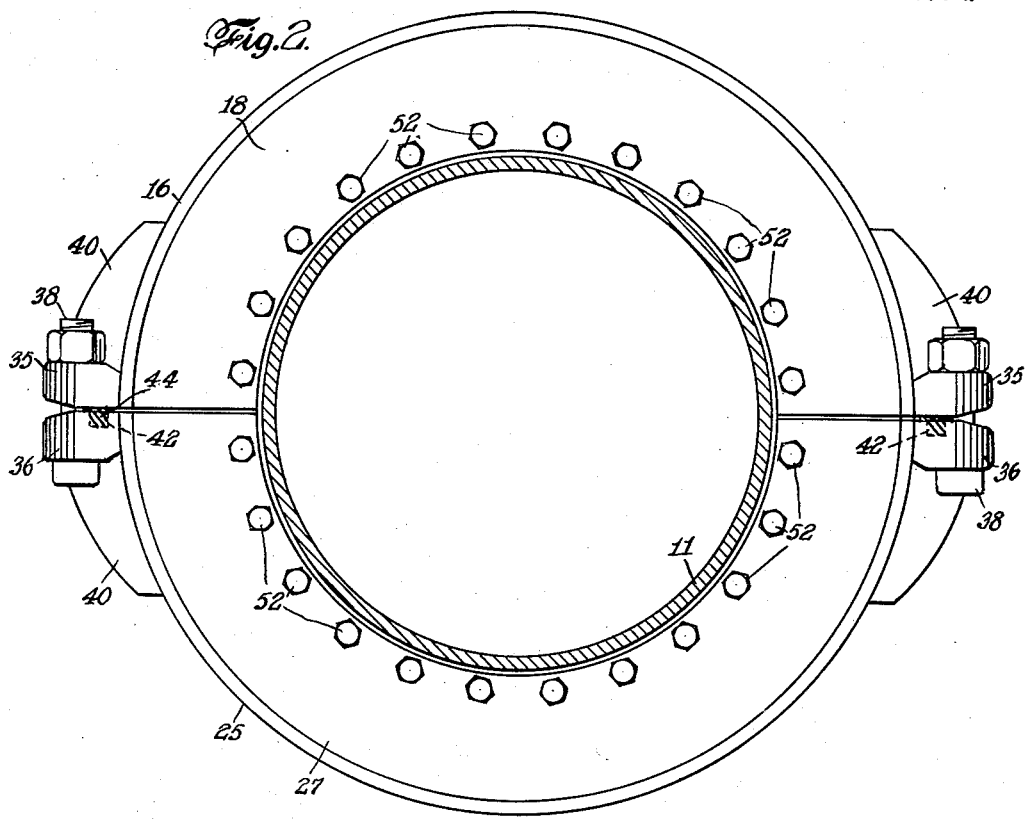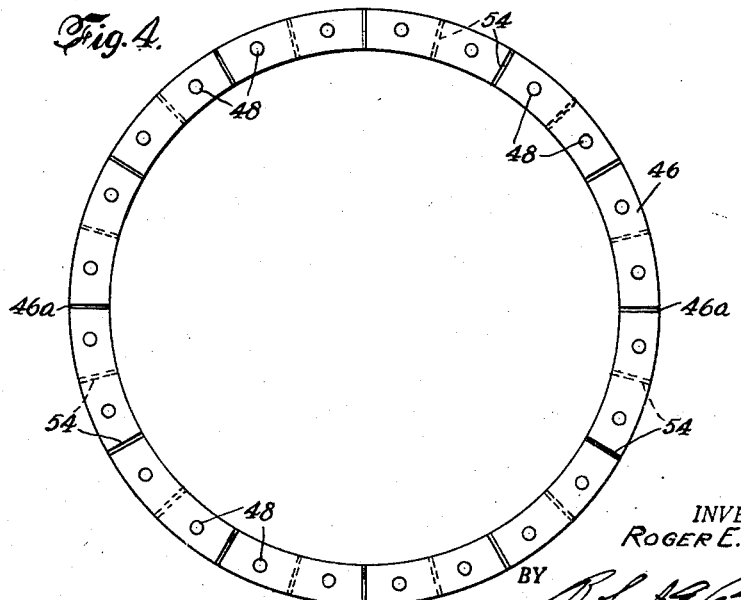

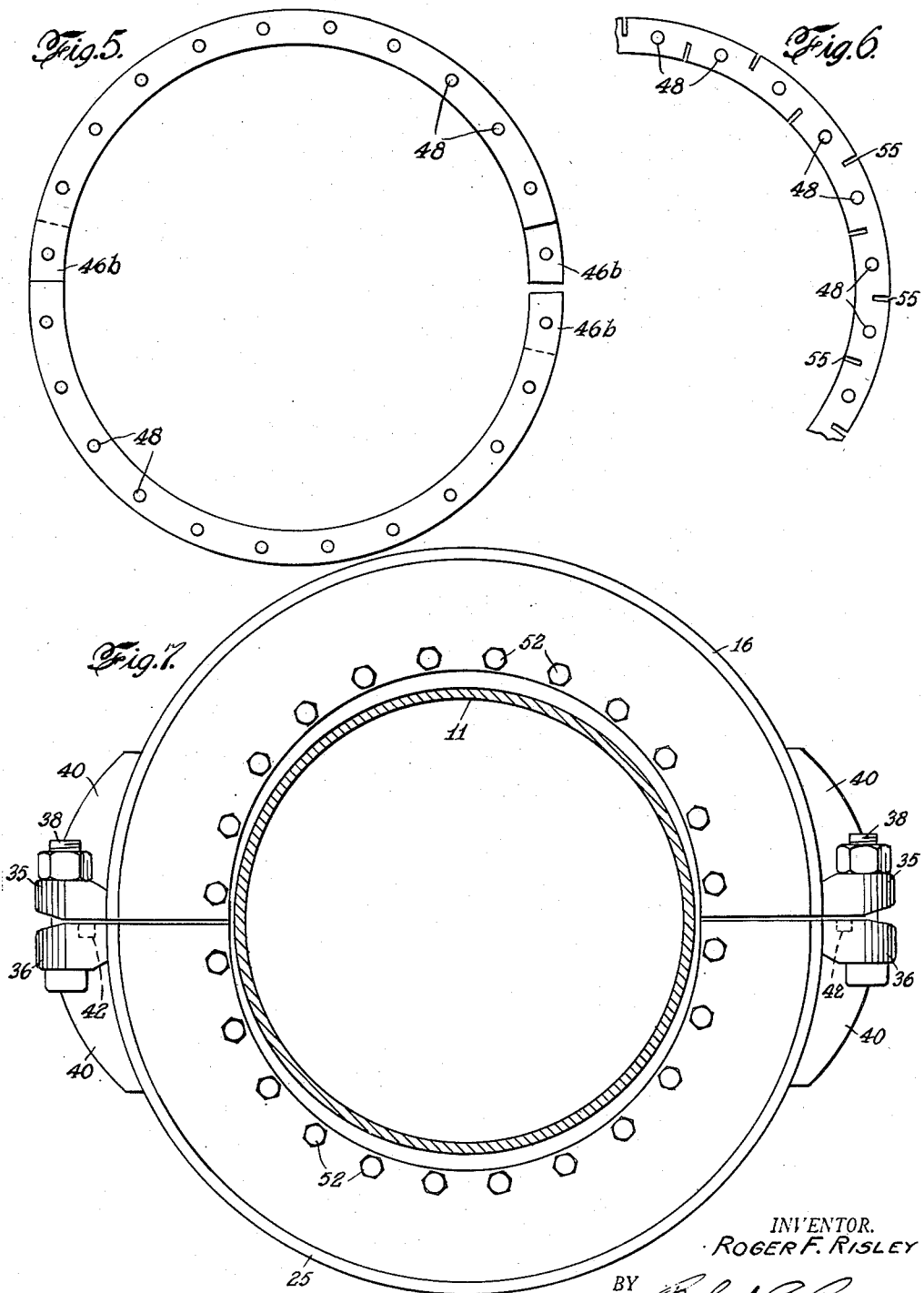

May 24, 1955

R. E. RISLEY 2,708,951

REPAIR SLEEVE

Filed Aug. 8, 1950

INVENTOR.
ROGER E. RISLEY
BY
ATTORNEY.

United States Patent Office 2,708,951
Patented May 24, 1955

2,708,951

REPAIR SLEEVE

Roger E. Risley, Bradford, Pa., assignor to Dresser Industries, Inc., Dallas, Tex., a corporation of Pennsylvania Application August 8, 1950, Serial No. 178,205

5 Claims. (Cl. 138—99)

This invention relates to repair sleeves for pipe lines and is more particularly concerned with a split repair sleeve adapted for application both to straight pipe runs and to bends.

Steel and iron pipe lines used for the transmission of oil, gas, water and like fluids both above and below ground occasionally develop leaks at the joints between adjacent sections of pipe, or breaks or cracks occur in the body of the pipe sections. Whenever possible, these leaks, breaks and cracks are repaired without taking the pipe line apart since costly interruptions in service are thus avoided. For this purpose there has been developed the so-called split repair sleeve which is adapted to be clamped around the portion of the pipe line to be repaired to provide a flexible but fluid-tight seal around the faulty section of the line. These split repair sleeves are generally made from cast or wrought metal and commonly comprise two segments provided with lateral flanges which are drawn together by means of side clamping bolts upon suitable packing material extending longitudinally of the segments. The ends of the segments are brought into fluid-tight engagement with the outer surface of the pipe by means of suitable gaskets and clamping rings which compress the gaskets radially against the pipe. While split repair sleeves have been extensively used and are generally satisfactory for repairing leaks and breaks in straight runs of pipe lines, a serious problem arises when the damage to be repaired occurs at a bend in the line. It has heretofore been necessary to fabricate a special sleeve to fit around the bend. The ordinary stock repair sleeve will accommodate a straight run or at most a 5° bend. This presents a serious practical problem in the maintenance of pipe lines. Either a large number of special sleeves, each adapted to fit around a different angle bend, must be stocked and handled, or a special sleeve must be ordered whenever a leak or break occurs in a bend with the result that substantial loss may occur between the time the special sleeve is ordered and the time it is delivered.

It is the principal object of the invention to provide a universal repair sleeve for pipe lines adapted to be used both for straight runs and for bends.

It is a further object of the invention to provide a repair sleeve for bends of simplified construction.

It is another object of the invention to provide a repair sleeve of the character indicated which may be manufactured rapidly.

It is a still further object of the invention to provide an improved follower ring for use with repair sleeves.

According to the invention I provide a two-segment repair sleeve the end walls of each segment of which are disposed at an angle relative to one another and the pipe apertures defined by the two segments are formed with outwardly-beveled edges. Cooperating with the beveled pipe apertures of the segments are clamping rings or followers having an inner edge beveled in a direction opposite to that of the pipe aperture bevel. In the preferred form of the invention the body of the repair sleeve is formed from two complementary segments which, when joined, define a cylindrical sleeve of trapezoidal vertical cross-section, and have arcuate end walls disposed at an angle with respect to the axis of the sleeve.

Other objects and features of the invention will be apparent from the following detailed description and from the drawings in which, Fig. 1 is a vertical sectional view, partly in elevation, of a repair sleeve embodying features of the present invention;

Fig. 2 is a partial end elevation of the sleeve of Fig. 1;

Fig. 4 is a plan view of the two segments of a gasket follower ring;

Fig. 5 is a plan view of a modified form of the follower shown in Fig. 4;

Fig. 6 is a fragmentary view of another form of follower;

Fig. 7 is a view in elevation of a modified form of end wall; and

Figure 1:
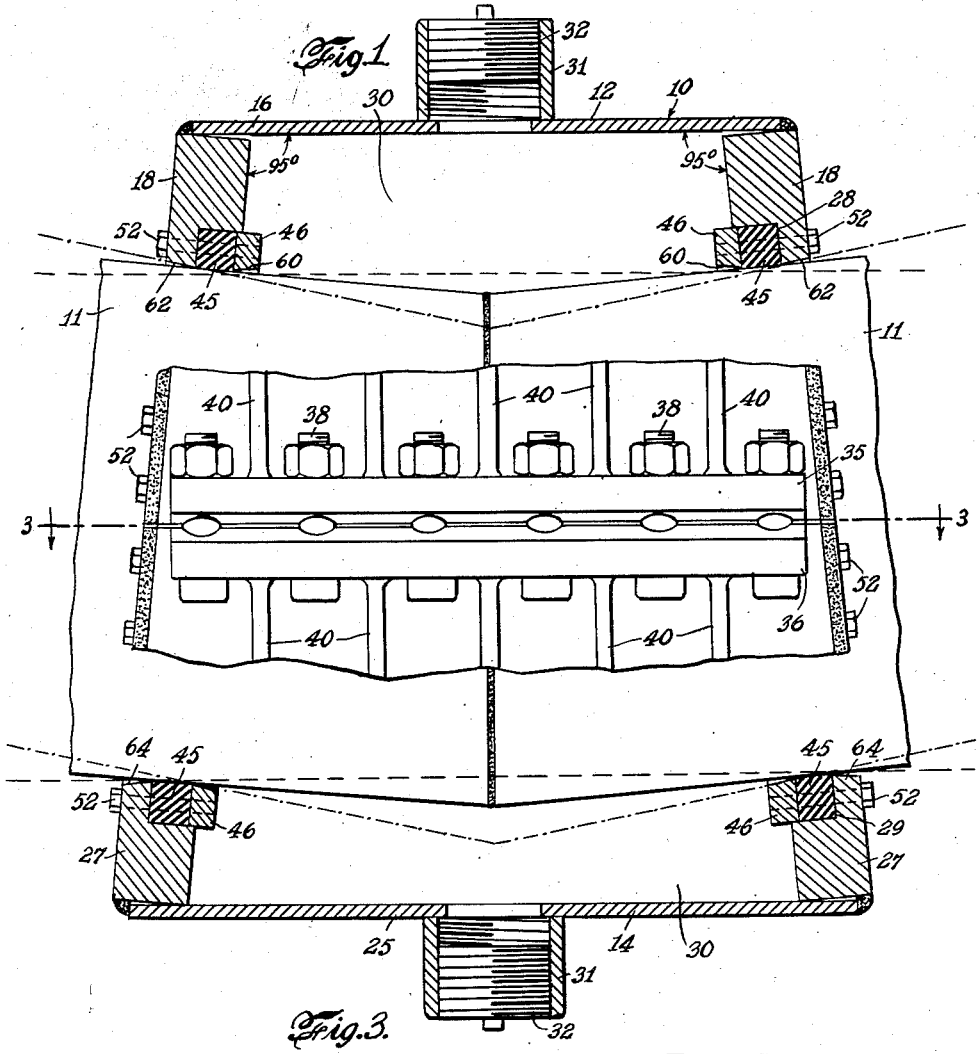

Referring to the drawings, the numeral 10 designates generally one illustrative embodiment of the split repair sleeve of the invention enclosing pipe 11. Sleeve 10 is formed by an upper arcuate half-section or segment 12 and a complementary lower half-section or segment 14. Sleeve segment 12 has an arcuate body portion 16 and outwardly diverging arcuate end walls 18 secured, as by welding, to body portion 16.

A feature of the invention is the provision of end walls which are disposed at an oblique angle relative to the horizontal axis of the sleeve and lie in two converging (or diverging) planes. In the embodiment shown in Fig. 1, the end walls 18 are disposed outwardly at an angle of about 5° from the vertical and thus define an angle of about 95° with body portion 16. This angle may be varied, if desired, the greater the angle the greater the pipe bend that can be accommodated, as will be described more fully hereinafter. For most purposes, however, an angle between about 5° and 10° is sufficient.

The lower sleeve segment 14 is formed by an arcuate body portion 25 having inwardly-converging arcuate end walls 27 which are disposed inwardly at an angle of 5° from the vertical and define an angle of 85° with body portion 25. It will be observed that the angle between end walls 27 and body portion 25 is the complement of the angle between side walls 18 and body portion 16. The angle between the end walls and body portion of lower sleeve segment 14 may be varied as described above but it will be apparent that in any given sleeve the deviation from the vertical of end walls 18 should be the same as the deviation of end walls 27. Thus, the two arcuate sleeve segments when joined define a cylinder which has been cut by two converging planes perpendicular to its axis. As will be apparent by reference to Fig. 2, the end walls 18 and 27 define, when the sleeve is assembled around the pipe sections, substantially circular apertures enclosing the pipe to which the sleeve is applied. The inner edges of end walls 18 and 27 are formed with gasket recesses 28 and 29 respectively which are adapted to receive suitable packing or gaskets for effecting fluid tight engagement with the outer surface of the pipe, as will be described more in detail hereinbelow.

The sleeve segments 12 and 14 thus define a chamber 30 which is of sufficient diameter to enclose the pipe and the joint connecting the pipe sections around which the sleeve may be placed. It will be understood that the size of chamber 30 will be such as to accommodate the type of joint or coupling for which it is designed to be used. The repair sleeve 10 illustrated in Fig. 1 could be used for the repair of a welded joint, which would ordinarily be encountered when the sleeve 10 is applied to a bend, and may also be used for a joint formed by a screw collar. It will be obvious, however, that where the sleeve is intended to enclose a bell and spigot joint, or a joint formed, for example, by an expansion coupling, the internal diameter of chamber 30 will be made of sufficient size to surround the particular joint to which it is to be applied. The particular dimensions of the chamber 30 does not affect the construction of the sleeve insofar as it relates to the present invention. Vent means for the chmaber 30 are conveniently provided by threaded apertures 31 closed by plugs 32.

Figure 3:
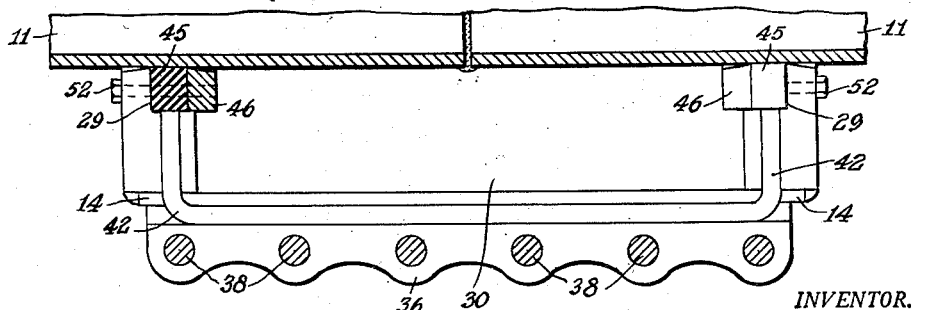
Fig. 3 is a partial view of the lower sleeve segment taken approximately along the line 3—3 of Fig. 1 and showing details of the side pack arrangement.

The longitudinal edges of segments 12 and 14 are formed with complementary joining means adapted to form a fluid-tight longitudinal joint and comprising side bars 35 and 36, respectively. Side bars 35 and 36 are secured, as by welding or in any other convenient manner, to the edges of the respective sleeve segments and are formed with registering bolt holes adapted to receive bolts 38. Reinforcing ribs 40 extending circumferentially over the outer surface of body portions 16 and 25 and secured thereto, as by welding, brace side bars 35 and 36 and give them the necessary strength. These straight side bars 35 and 36 are an important feature of my repair sleeve from the manufacturing standpoint. In repair sleeves heretofore made for pipe bends, the side bars have followed the angle of the bend and required special fabrication. In the sleeve shown in Fig. 1, however, the side bars on both sides of the sleeve are straight and of equal length and are thus adapted to rapid manufacture and assembly with the sleeve segments. The faces of side bars 36 and, as shown in Fig. 3, the adjacent face portions of end walls 27 are provided with longitudinally disposed grooves 42, the opposite ends of which are curved inwardly so that they will terminate at and communicate with the respective gasket recesses 29. These grooves may be of any convenient form longitudinally and they will naturally follow to a certain extent the configuration of the chamber 30. The grooves 42 are preferably of substantially uniform width throughout their length, and throughout their depth, and are preferably of rectangular shape, although this is not essential. Each of the grooves 42 receives a longitudinal side packing 44 of a width substantially equal to that of the grooves 42 and of a thickness somewhat greater than the depth of the grooves so that when the packing 44 is inserted in the grooves a considerable portion of it will extend upwardly above the face of side bar 36. Thus, when the two sleeve sections 12 and 14 are drawn together by the action of bolts 38 the packing 44 is compressed and is displaced laterally to provide a secure, fluid-tight seal.

A fluid-tight seal is likewise provided at the ends of the sleeve 10 by means of previously-mentioned packing or gaskets 45 which are adapted to be compressed in gasket recesses 28 and 29 and to be displaced radially inwardly into sealing relationship with the outer surface of pipe 11 and the side packings 44. While gaskets 45 may be of any convenient form, they are suitably cut from a straight strip or molded to a circular form with the meeting ends formed to effect a butt joint or, preferably, the ends are mitered or beveled so that they may be wrapped around the pipe and inserted in gasket recesses 28 and 29 with the beveled ends overlapped.

The gaskets 45 and the side packing strips 44 are formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined.

Gaskets 45 are compressed into sealing relationship with pipe 11 by means of clamping rings or followers 46. In the embodiment shown in Fig. 4 each follower 46 is made in two sections with abutting ends as indicated at 46a. As shown in Fig. 5 I may also form the sections of followers 46 with complementary overlapping ends 46b defined by portions of reduced thickness, i. e. approximately half the thickness of follower 46, so that when the end portions 46b are overlapped the overall thickness of the follower will not be increased. Each follower is provided with a series of threaded apertures 48 which are adapted to register with bolt holes in end walls 18 and 27. Followers 46 are drawn toward end walls 18 and 27 by means of bolts 52. In the case of the follower shown in Fig. 4 the apertures 48 are so arranged that the meeting ends 46a will lie between adjacent apertures 48, whereas in the case of the follower shown in Fig. 5 an aperture 48 is provided in each of the end portions 46b. While both faces of followers 46 may be formed as plane surfaces, I preferably provide axial grooves or cuts 54 in at least one of the faces and preferably both. The cuts 54 extend between the bolt holes and when both faces of the followers are grooved I preferably alternate the grooves from one face to the other. I thus form an articulated follower which is deformed under the influence of bolts 52 to effect more uniform compression of the gaskets around the pipe and thus insure the fluid-tightness of the seal. Since, as will be apparent, when my repair sleeve is applied to a straight run of pipe or to a large angle bend, the followers encircling the portions of the pipes enclosed by the sleeve will lie on a somewhat elliptical path. The provision of articulated followers as described above will serve to compensate for this slightly non-circular path and equalize the gasket compression. In another embodiment I also provide radial cuts extending inwardly from the inner surface of the follower as shown in Fig. 6 which is a fragmentary view of a follower provided with radial cuts 55.

As previously mentioned, my repair sleeve is adapted to be used either on straight pipe runs or on bends, i. e. it is intended to be of substantially universal utility with respect to the type of pipe-line leaks and breaks ordinarily encountered. It will be obvious that the pipe sections of a straight run of pipe entering the sleeve will form a different angle with respect to the tapering end walls 18 and 27 from that which will be formed between the end walls and the pipe sections of a bend. To accommodate these varying angles, I not only dispose the end walls in converging or diverging planes, as previously described, but I also form the radially inner edges of end walls 18 and 27 with an outwardly sloping bevel and I provide the radially inner surfaces of the clamping rings or followers 46 with inwardly-sloping bevels.

Referring to Fig. 1 it will be observed that the inner edges 60 of the followers 46 slope inwardly away from the surface of pipe 11 while the inner edges 62 and 64 of end walls 18 and 27, respectively, slope outwardly away from pipe 11. The angle of slope of the bevelled edges of the end walls and the followers may, of course, vary but should be at least equal to the angle made between end walls 18 and sleeve section 12, and preferably should be slightly greater. The slopes of edges 60, 62 and 64 are preferably equal.

While in Fig. 1 I have shown the end walls 18 and 27 to be of uniform width and thus to define a circular aperture for receiving pipe 11 I may advantageously gradually decrease the width of end walls 18 and 27 from the outer ends thereof toward the center whereby as shown in Fig. 7 the pipe aperture is somewhat oval or elliptical in outline. When the end walls are thus formed the bevel on the outer edges of the end walls may be reduced or eliminated. Since, however, the maximum clearance which is practical between the pipe and the entrance aperture of the sleeve is about 3/16", it is obvious that the reduction in width of the end walls 18 and 27 to form the oval aperture should not be excessive. Too great a clearance places an undue burden on the gasket. I prefer therefore to bevel the end walls as previously described, since a more accurate construction of the sleeve is thus possible.

It will be understood that the end walls are constructed to provide pipe apertures in sizes to fit any of the standard sizes for steel or iron pipe. Commercial pipe of any standard size varies from what may be termed the nominal exterior diameter, some pipe being slightly under-size and some pipe being slightly over-size. The end walls 18 and 27 are accordingly formed to accommodate the maximum over-size pipe of any standard size.

To assemble the repair sleeve over a leaky joint or a cracked or damaged section of a straight run of pipe, the two segments 12 and 14 with the gaskets 45 and the followers 46 loosely secured to end walls 18 and 27 by means of bolts 52 are positioned around the pipe and the two segments drawn together by means of bolts 38 to compress side packing strips 44 to form a fluid-tight seal between the sleeve segments. The bolts 52 are then tightened to draw followers 46 toward end walls 18 and 27 to compress gaskets 45 in gasket recesses 28 and 29 and thereby cause the gaskets to expand radially inward into sealing engagement with the outer surface of the pipe and with the ends of side backing strips 44. In assembling the repair sleeve on a joint, the segments are arranged in such manner that the dividing line between the segments lies in a plane which is substantially perpendicular to the plane of the bend. The relative positions of the sleeve with respect to a straight run of pipe, a 10° bend and a 20° bend will be seen by reference to Figure 1. In this figure the 10° pipe bend is indicated in continuous lines, the straight run is indicated by broken lines and the 20° bend is indicated by dotted lines. It will be seen that the repair sleeve of the invention accommodates these three conditions with equal facility. The 10° bend passes at right angles through the end walls 18 and 27; the straight run passes through the end walls 18 and 27 at an oblique angle being substantially parallel to the bevelled edge of the upper portion of followers 46 and to the bevelled edges 64 of end walls 27. The 20° bend likewise passes through the end walls 18 and 27 at an oblique angle being substantially parallel to the bevelled edges of the lower portion of followers 46 and to the bevelled edges 62 of end walls 18. It will also be apparent that a bend of an angle greater than 20° may be readily accommodated by increasing the slope of the bevelled edges of followers 46 and end walls 18 and 27 and the angle between end wall 18 and body 16 and end wall 27 and body 14 of the segments may also be increased to accommodate bends of greater angles. Ordinarily, bends of more than 20 to 30° are not very frequently encountered in practice and the embodiment illustrated is suitable for any of the great majority of bends.

While I have hereinabove described a preferred embodiment, it will be apparent that my invention is susceptible of other embodiments.

Figure 8:
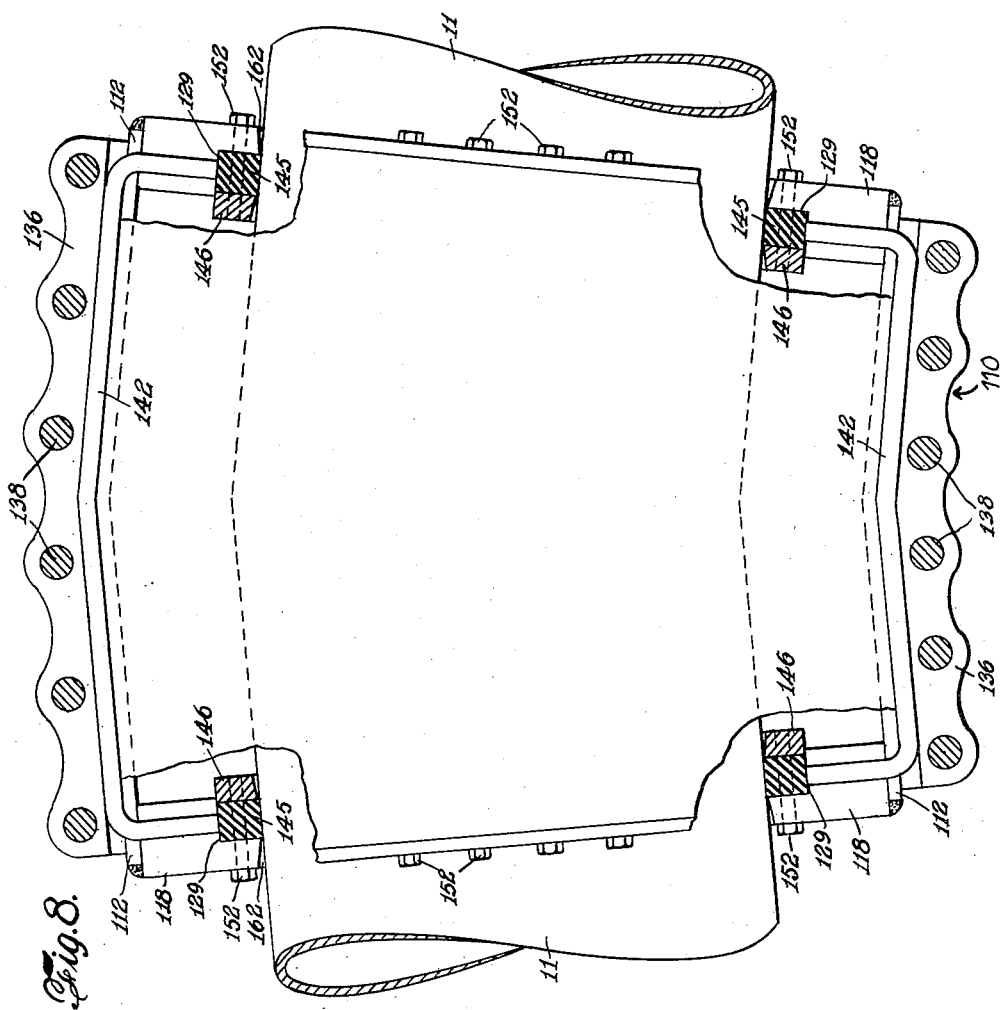
Fig. 8 is a side elevation partly in section of another embodiment of the invention.

Referring to Fig. 8 for example, there is shown a repair sleeve adapted to receive either a straight run of pipe or a bend. This embodiment differs from that of Fig. 1 primarily in the form of the body portion 112. Each segment of the sleeve shown in Fig. 8 has a body portion in the form of a bend of 10° and the abutting edges of the two segments lie in the same plane as the bend. Secured as by welding to the arcuate ends of body 112 are arcuate end walls 118 and similarly secured to the lateral edges of body 112 are side bars 136 formed from two members which are joined at the center of the edge of body 112. Side bars 136 are drawn together by means of bolts 138. The side bars 136 and end walls 118 are provided with a longitudinal packing groove 142, the opposite ends of which are curved inwardly so that they will terminate at and communicate with the gasket recesses 129 formed in end walls 118. As in the case of the embodiment of Fig. 1, packing grooves 142 are adapted to receive a suitable side packing strip for effecting a sealing joint between the two segments of the sleeve. Similarly the gasket recesses 129 are adapted to receive gaskets 145, and gasket followers 146 are drawn toward end walls 118 to compress gaskets 145 by means of bolts 152. End walls 118 and followers 146 are of the same construction as the corresponding end walls 18 and 27 and gaskets 45 of sleeve 10, i. e. the radially inner edge of end walls 18 are provided with inwardly sloping bevels 162 and gaskets 145 are similarly bevelled along their radially inner edge.

The sleeve 110 is assembled around the pipe to be repaired as described above in connection with sleeve 10 except that when sleeve 110 is applied to a joint the line of division between the sleeve sections lies in the plane of the bend of the pipe rather than in the plane perpendicular to the bend as is the case in the embodiment shown in Fig. 1.

While I have hereinabove described my device as a repair sleeve suitable for application to an existing pipe line to enclose a leaking section, it will be apparent that it may also be used, if desired, as a pipe coupling for effecting a union between two separate pipe sections. The device may thus be used to join pipe sections disposed either at an angle or in co-axial alignment. It is clear, therefore, that the device of the invention is of wide utility.

It will be obvious that various other changes and modifications may be made in my invention without departing from the scope thereof as defined in the appended claims and it is intended therefore that all matter contained in the foregoing description and in the drawings shall be interpreted as illustrative and not in a limiting sense.

What I claim and desire to secure by Letters Patent is:

1. A universal split sleeve pipe repair device for application to any portion of a pipe line, including straight sections and bends, to define a fluid-tight enclosure for said portion of the pipe line, said device comprising a pair of complementary segments adapted to inclose said portion of said pipe line, each segment including an arcuate body portion having radially outwardly-extending side flanges on each longitudinal edge thereof for joining said segments to form a tubular chamber, arcuate end walls extending radially-inwardly of the ends of said body portion to define a circular pipe-receiving aperture, the end walls of each segment being disposed at an oblique angle relative to the body portion, the angle between the end walls and body portion of one segment of said pair being supplementary to the angle between the end walls and body portion of the other segment, a gasket recess formed along the inner edge of each end wall and follower means for compressing a gasket in said recess, said pipe-receiving aperture and said follower being adapted selectively to accommodate the pipe line co-axially and at an oblique angle.

2. A universal split sleeve pipe repair device for application to any portion of a pipe line, including straight sections and bends, to define a fluid-tight enclosure for said portion of the pipe line, said device comprising a pair of complementary segments adapted to inclose said portion of said pipe line, each segment including an arcuate body portion having radially outwardly-extending side flanges on each longitudinal edge thereof for joining said segments to form a tubular chamber, arcuate end walls extending radially-inwardly of the ends of said body portion to define a circular pipe-receiving aperture, the end walls of each segment being disposed at an oblique angle relative to the body portion, the angle between the end walls and body portion of one segment of said pair being supplementary to the angle between the end walls and body portion of the other segment, a gasket recess formed along the inner edge of each end wall, and follower means for compressing a gasket in said recess, said follower having a longitudinally outwardly-bevelled inner peripheral edge, whereby selectively to accommodate the pipe line co-axially and at an oblique angle.

3. A universal split sleeve pipe repair device for application to any portion of a pipe line, including straight sections and bends, to define a fluid-tight enclosure for said portion of the pipe line, said device comprising a pair of complementary arcuate segments adapted to inclose said portion of said pipe line, radially outwardly-extending side flanges on each longitudinal edge of said segments for joining said segments, and arcuate end walls extending radially-inwardly of said segments to define a pipe-receiving aperture at each end of said sleeve, the end walls of each of said segments being disposed at an oblique angle relative to one another in such manner that the radii of one end of said sleeve defined by said end walls lie in a plane which is oblique with respect to the plane passing through the radii of the opposite end of said sleeve defined by said end walls, and the periphery of said aperture being formed with a longitudinally inwardly-converging taper, and sealing means cooperating with said aperture selectively to accommodate the pipe line co-axially and at an oblique angle.

4. A universal split sleeve pipe repair device for application to any portion of a pipe line, including straight sections and bends, to define a fluid-tight enclosure for said portion of the pipe line, said device comprising a pair of complementary segments adapted to inclose said portion of said pipe line, each segment including an arcuate body portion having radially outwardly-extending side flanges on each longitudinal edge thereof for joining said segments to form a tubular chamber, arcuate end walls extending radially-inwardly of the ends of each body portion, the radii of one end of said sleeve defined by said end walls lie in a plane which is oblique with respect to the plane passing through the radii of the opposite end of said sleeve defined by said end walls, the inner edge of each end wall being bevelled inwardly whereby to define a pipe aperture having an inwardly-converging tapered periphery, a gasket recess in said end walls adjacent the said tapered periphery, and follower means for compressing a gasket in said recess, said follower means cooperating with said pipe aperture to accommodate selectively the pipe line in co-axial relationship and at an oblique angle.

5. A universal split sleeve pipe repair device for application to any portion of a pipe line, including straight sections and bends, to define a fluid-tight enclosure for said portion of the pipe line, said device comprising a pair of complementary segments adapted to inclose said portion of said pipe line, each segment including an arcuate body portion having radially outwardly-extending side flanges on each longitudinal edge thereof for joining said segments to form a tubular chamber, arcuate end walls extending radially-inwardly of the ends of each body portion, the radii of one end of said sleeve defined by said end walls lie in a plane which is oblique with respect to the plane passing through the radii of the opposite end of said sleeve defined by said end walls, the inner edge of each end wall being bevelled longitudinally inwardly, whereby to define a pipe aperture having a longitudinally inwardly-converging tapered periphery, a gasket recess in said end walls adjacent the said tapered periphery, and follower means for compressing a gasket in said recess, said follower means having a bevelled inner periphery, whereby said pipe aperture and said follower will accommodate the pipe line selectively in co-axial relationship and at an oblique angle.

References Cited in the file of this patent

UNITED STATES PATENTS

| | | |
|---|---|---|
| 18,136 | Corliss | Sept. 8, 1857 |
| 1,025,884 | Schmitt | May 7, 1912 |
| 1,051,086 | Clark | Jan. 21, 1913 |
| 1,252,888 | Dorsey | Jan. 8, 1918 |
| 1,457,461 | Renshaw | June 5, 1923 |
| 1,478,172 | Clark | Dec. 18, 1923 |
| 1,486,708 | Welles | Mar. 11, 1924 |

FOREIGN PATENTS

| | | |
|---|---|---|
| 1,800 | Great Britain | of 1855 |
| 117,753 | Austria | of 1930 |
| 582,854 | Great Britain | of 1946 |